Patented Dec. 26, 1950

2,535,784

UNITED STATES PATENT OFFICE 2,535,784

PROCESS FOR PRODUCING MAHOGANY ACIDS AND MAHOGANY SOAPS

Charles A. Cohen, Roselle Park, N. J., assignor to Standard Oil Development Company, a corporation of Delaware No Drawing. Application December 3, 1946, Serial No. 713,843

6 Claims. (Cl. 260—504)

This invention relates to an improved mahogany acid soap and the process of its production.

The present application is a continuation in part of my copending application Serial No. 505,507 filed October 8, 1943, now Patent No. 2,413,311 dated December 31, 1946 which in turn is a continuation in part of my earlier application Serial No. 371,777, filed December 26, 1940, now Patent No. 2,388,677 dated January 13, 1946. This present application also contains subject matter common with that in my application Serial No. 370,626 filed December 18, 1940 which became abandoned on September 18, 1945.

In the production of highly refined mineral oils or white oils, by the action of strong sulfuric acid or fuming sulfuric acid on a petroleum distillate, two major by-products are formed. The first consists of a group of oil-soluble, sulfonic acids which remain in the oil layer after the acid sludge has been separated and is known as "mahogany acid" and the product of their neutralization with a base is known as a "mahogany soap". The color of mahogany soaps may vary from water-white to a deep red depending on their degree of purity.

The second major by-product consists of a group of water-soluble sulfonic acids which remain in the sludge layer and may be separated by appropriate means. These are known as "green or black" acids.

Heretofore, mahogany soaps have been secured by first drastically treating a petroleum oil fraction with strong sulfuric acid or fuming sulfuric acid, followed by separation of the acid sludge from the oil, neutralization of the acid oil or so called "sour" oil with an alkali, followed by substantially complete removal of the oil-soluble sulfonic acid salts or mahogany soaps from the oil by water-washing or by dilute alcohol or by other substantially immiscible solvent. The mahogany soaps are recovered from their solvent solution by removing the solvent by distillation. If sulfonic acids per se are desired, they are extracted without neutralization of the oil.

The mahogany soaps secured by this means have normally been contaminated in the past with impurities such as sodium or other metal hydroxide or carbonate, etc., depending on the alkali used for neutralization, together with varying proportions of sodium sulfate and sodium sulfite. They may vary in color from a straw through mahogany to a deep red. Although normally considered a by-product of the manufacture of white oil, the mahogany soaps have considerable economic value. When properly purified they may be used as emulsifying agents in the preparation of "soluble oils" for use in textile wet finishing, cutting oils, fat liquoring of leathers, or may be used as fat-splitting agents, wetting agents, surface tension depressants and the like.

It has now been found that the major part of the color of the mahogany soaps as ordinarily prepared is due to the inclusion of "pepper sludge" in the acid oil at the time the oil is neutralized and extracted with solvent. As indicated above, the oil is treated with strong or fuming sulfuric acid and the sludge separated from the oil by settling and decantation. The acid oil leaving the settler contains some dissolved sulfur dioxide, some mahogany sulfonic acids in solution and in addition, is nearly opaque and black in color due to the presence of a quantity of suspended or dispersed particles or globules of "green or black acids", tar and acid sludge which shows no disposition to settle even, after long standing. These dispersed particles of black acid, tar, sludge, and unreacted sulfuric acid, etc., are known collectively as "pepper sludge" and appear to be in a colloidal state of suspension. The term pepper sludge, as used herein, refers to all these materials, and it is highly acidic in nature and when neutralized has great tinctorial power. When acid oil containing such pepper sludge is neutralized and extracted with a solvent, the neutralized pepper sludge is included in the mahogany soap giving the soap its characteristic color. If the sulfonic acids are extracted without neutralization they are likewise colored.

Pure mahogany sulfonic acids are strong acids and give neutral salts or soaps with strong alkalies. They are true sulfonic acids and can be characteristically differentiated from alkyl sulfates or esters of sulfuric acid in that they do not hydrolyze to free sulfuric acid even after long boiling with concentrated hydrochloric acid or water. The organic portion of the mahogany acid is generally considered to be of a naphthenic character, even though predominately paraffinic oils, such as Pennsylvania oils, give rise to essentially the same types of mahogany acids as are derived from other crudes. When pure, the mahogany soaps have a good tolerance for salts of the alkaline earths and can therefore be used as emulsifying agents for oils in regions where hard water is available. On the other hand, alkaline earth salts of the "green or black" acids, when added to emulsions, cause a reversal in phase and are often used to break emulsions. The inclusion, therefore, of some pepper sludge with its attendant green acid in the mahogany soap at the time of neutralization, gives not only a poorer colored soap but also causes a decrease in its emulsifying power.

One of the major objects of this invention is to prepare mahogany acids and mahogany soaps entirely free of pepper sludge or green acids and their neutralization products.

According to the present invention, a sulfuric acid-treated oil, after substantial removal of the sludge by settling or by centrifuging but before neutralization, is treated with a finely divided substance selected from the group comprising filter aids of diatomaceous origin, materials of siliceous origin, such as tripoli or finely ground silica, or activated carbon, and the finely divided substance-pepper sludge complex removed, and the mahogany acid or the product of its neutralization with a base removed from the oil by means of a substantially immiscible solvent, such as water, dilute alcohol or acetone, or the like. The solvent is then recovered by distillation leaving the acid or soap. This process yields a product which varies in color from a light yellow to water-white.

Materials of diatomaceous origin which are suitable for the practice of this invention are commercially available as filter aids such as the "J-M Celites" and "Filter Cels" or "Dicalites." Either the natural dried and ground earth may be used or it may be calcined with or without alkali or may be acid-treated and calcined. Materials of siliceous origin such as tripoli or finely ground silica such as is used for polishing agents and commercially available as "Snow Floss" or "Super Floss" are suitable as is finely ground carborundum. Another class of materials suitable for the practice of this invention are the finely ground carbons which may be natural, acid treated, or activated types. Other materials of like nature may be used but the above are the preferred types. Various finely ground clays, such as Attapulgus fines, may be used but materials such as bentonite are not considered desirable.

Solid materials of the character described above, particularly when used in small quantities, are not materially adsorbent or absorbent of the preferentially oil soluble sulfonic acids but are effective to absorb, adsorb or otherwise combine or form a complex with the pepper sludge to form a coprecipitate. The quantity of materials used may vary widely. Normally, less than 1% on a weight/volume basis, e. g. grams per 100 ml., is adequate and as little as 0.02% has been found effective where the sulfonic acid and pepper sludge contents are low. On the other hand quantities of 3% have been used in practice over extended periods and the use of as much as 10% is feasible in some cases. Normally, however, a desirable range would be from 0.2% to 0.8%.

The proper use of these solid materials as sorbents or co-precipitating agents accomplishes the following: The colors of the recovered oil and sulfonic acids are improved; contamination of the mahogany acids with sulfuric acid or the neutralized mahogany sopas with inorganic sulfate is prevented since all of the free sulfuric acid in the system is removed along with the pepper sludge; contamination of the mahogany acid with $SO_2$ or the neutralized mahogany soap with inorganic sulfite may be prevented by permitting removal of the dissolved $SO_2$ by simple air blowing or by vacuum stripping without degrading the mahogany acid or the oil; all of the water soluble sulfonic acids, i. e. green acids, are removed and substantially all of the preferentially oil soluble sulfonic acids are left in solution.

The diatomaceous filter aid or tripoli or silica and the like is added to the acid oil in an amount equal to from 1 to 40 lbs. per thousand gallons of oil. The method of treating the oil with the above substances may be varied from either the direct addition of these materials to the oil in the form of dry powder or the materials may be previously admixed with a portion of clear oil to form a slurry which can be pumped into the main body of the oil. The oil, after the addition of the filter aid, may be agitated for a period of from 5 minutes to ½ hour. If, for example, filter aid has been used, the filter aid-pepper sludge complex is then removed either by filtering or by settling.

If filtering alone is used, it may be done with conventional filter presses such as the plate and frame press or with a continuous rotary type of press. It is advantageous when using a filter press to precoat the press with filter aid in the proportion of 5 to 10 pounds of filter aid for every one-hundred square feet of filter press area. If settling is the means used for removing the filter aid-pepper sludge complex from the acid oil, it may be accomplished by running the acid oil-filter aid mixture into a settling drum at a rate designed to give the oil a settling time of from 5 minutes to one hour. A combination of settling and filtration may be used in that the oil after treatment is given a settling sufficient to drop most of the filter aid-pepper sludge complex out and is then finished by filtering either with or without the addition of more filter aid. An alternate method of separating the filter aid sludge complex from the oil is by means of a centrifuge such as a basket type or one capable of discharging a slurry continuously.

The inventor has not attempted to postulate a theoretical mechanism for the operation of this invention but the diversity of materials which are suitable for the practice of this invention and the rapidity with which agglutination or clumping of the pepper sludge particles takes place after the filter aid or tripoli or silica has been added, without diminishing within practical limits the original mahogany acid content of the acid oil, has led the inventor to believe that the phenomenon represents a mutual coprecipitation of oppositely charged colloidal particles. A curious observation in the practice of this invention is that within certain limits, the less filter aid is used, the more rapidly does the filter aid-pepper sludge complex settle. This is thought to be due to the fact that the pepper sludge has a relatively high density and when precipitated with the filter aid, the less the amount of filter aid used the higher the resultant density. If the oil has been treated with enough acid to make a white oil, that is, shows no residual sulfonatable material, the oil leaving the settler or filter press is perfectly clear and water-white and has a color of +30 Saybolt.

The oil leaving the sludge separator, where most of the sludge has been permitted to settle out, will vary in temperature from substantially atmospheric temperature of about 100° C., depending on the conditions and the severity of the acid treat. Some cooling takes place in the sludge separator, but under certain conditions it may be desirable to apply heat artificially to the oil-sludge mixture in order to maintain a state of fluidity or to reduce the viscosity of the oil while settling.

The acid oil after contacting with filter aid, or silica or tripoli and the like, and settling or filtration, is perfectly free of pepper sludge and contains the original amount of mahogany acids present along with a certain amount of dissolved sulfur dioxide. The oil may be neutralized at this stage with a basic material such as the alkali hydroxides, carbonates and the like, or organic bases, such as triethanolamine, isopropanolamine and pentanolamine may be used. In order to save on the amount of alkaline material used or obviate the necessity of removing inorganic impurities such as sulfates, sulfites, etc. from the neutralized mahogany soap in a later purification step, the sulfur dioxide may be removed by air blowing, or by countercurrent air or inert gas stripping in a packed or bubble plate column, or the acid oil may be subjected to vacuum at ordinary or elevated temperatures, by means well known to the art. The removal of the sulfur dioxide may be made an inherent feature of the filtration step, in that the filtration may be run under vacuum such as is commonly done in the laboratory in a Buchner funnel or a combination of pressure and vacuum may be used.

In neutralizing the acid oil after removal of the sulfur dioxide, it is often desirable for some purposes to add the stoichiometric quantity of alkali. A solution of purified mahogany sulfonate in oil results, which is usable without further treatment as a "soluble oil" in the textile and cutting oil trade, or the exactly neutralized soap may be extracted with an oil immiscible solvent.

Ordinarily, the mahogany soap is extracted from the oil after neutralization, and the alkali may be dissolved in the immiscible solvent at the time it is added to the acid oil, or the oil may be first neutralized and then extracted with immiscible solvent. On settling, a lower layer of solvent with dissolved soap settles out leaving a clear supernatant oil. The washing step may be repeated as often as is required to remove all of the soap from the oil layer.

The solvent extracts are united and the solvents removed by distillation, leaving as a residue the desired mahogany soaps. The soaps may be further purified by solution in strong alcohol, or may be extracted with light naphtha while in dilute alcohol solution to remove a small amount of oil which usually accompanies the soap.

The soaps made in accordance with this invention possess valuable advantages over soaps of the prior art. In addition to showing a higher degree of emulsifying power as compared to the same soap with attendant pepper-sludge, the new soap is free from staining tendencies when used in the wet processing of white textiles.

The invention will be more clearly illustrated by the following example:

Example 1

1000 gallons of an oil which when finished had a viscosity of 85 seconds Saybolt at 100° F. was treated after settling 15 hours following the last acid dump with 20 lbs. of J-M #545 Celite, agitated for a period of 15 minutes at a temperature of about 35° C., allowed to settle for one-half hour when most of the pepper sludge-filter aid complex had settled out, and then filtered through a plate and frame press which had been previously precoated with the same filter aid to the extent of 5 lbs. of filter aid for every hundred square feet of filter press area. The analysis of the oil at this stage showed a sulfonic acid content of approximately 4 grams for every 100 cc. with a dissolved sulfur dioxide content equal to the same quantity. The sulfur dioxide was removed by vacuum stripping, the oil neutralized with a solution of sodium carbonate, and the mahogany soaps extracted from the oil with a 50% solution of isopropyl alcohol in water. On removal of the solvent, which was accomplished by distillation, a portion of the soap made up in a 10% by weight solution in a water-white oil gave the following colors in a 1" cell in a Lovibond Tintometer: 1.2 yellow, .2 red. The same oil worked up for soap without the removal of the pepper sludge by means of filter aid gave a soap which had a color of 25 yellow, 4.1 red when made up to the same concentration in a water-white oil. In testing both soaps for emulsibility, the purified soap gave a good emulsion in 2½% concentration whereas the unpurified soap required an 8% concentration for a similar emulsion.

It will be understood that the various treating steps and the conditions under which they are performed may be varied, as described in my aforesaid copending application Serial No. 505,507. Thus the sulfuric acid strength and volume, temperature of acid treatment and time of contact may be varied, depending on the viscosity of the oil used, the degree and method of its refinement, other physical characteristics such as specific gravity, aniline point, viscosity index, etc. Chemical characteristics such as degree of unsaturation, and percentage composition of paraffins, naphthenes and aromatics will also vary and require various conditions for appropriate acid treatment. As indicated above, the treatment temperatures may be from ambient temperature up to about 100° C. or more, a suitable range being from 10° C. to 100° C. A range more commonly used lies between 10° and 80° C.

By the above process I have found it possible to produce oil soluble sulphonates having a high degree of purity.

What is claimed is:

1. In the preparation of preferentially oil-soluble sulfonic acid soaps in which a hydrocarbon oil is treated with fuming sulfuric acid, the sludge separated, and the sour oil neutralized to form preferentially oil-soluble sulfonates, the improvement comprising contacting the sour oil with from 0.02 to 10% of a solid sorbent material, removing the sorbent material, neutralizing the oil and recovering preferentially oil-soluble sulfonic acid soaps.

2. In the preparation of preferentially oil-soluble sulfonic acid soaps in which a hydrocarbon oil is treated with fuming sulfuric acid, the sludge separated, and the sour oil neutralized to form preferentially oil-soluble sulfonates, the improvement comprising contacting the sour oil with from 0.02 to 3% of a solid sorbent material, removing the sorbent material, neutralizing the oil and recovering preferentially oil-soluble sulfonic acid soaps.

3. In the preparation of preferentially oil-soluble sulfonic acid soaps in which a hydrocarbon oil is treated with fuming sulfuric acid, the sludge separated, and the sour oil neutralized to form preferentially oil-soluble sulfonates, the improvement comprising contacting the sour oil with from 0.02 to 0.8% of a solid sorbent material, removing the sorbent material, neutralizing the oil and recovering preferentially oil-soluble sulfonic acid soaps.

4. In the preparation of preferentially oil-soluble sulfonic acid soaps in which a hydrocarbon oil is treated with fuming sulfonic acid, the sludge removed, the SO₂ separated and the sour oil then neutralized, the improvement which comprises treating the sour oil with 0.02 to 3% of a solid sorbent material at a temperature within the range of from about 10° C. to about 100° C., removing the solid sorbent material from the sour oil, neutralizing the sour oil to convert the preferentially oil-soluble sulfonic acids to the corresponding sulfonates and extracting the resulting preferentially oil-soluble sulfonates from the neutralized oil.

5. In the preparation of preferentially oil-soluble sulfonic acid soaps in which a hydrocarbon oil is treated with fuming sulfonic acid, the sludge removed, the SO₂ separated and the sour oil then neutralized, the improvement which comprises treating the sour oil with 0.02 to 3% of a solid sorbent material at a temperature within the range of from about 10° C. to about 100° C., removing the solid sorbent material from the sour oil, extracting the preferentially oil-soluble sulfonic acids from the sour oil and neutralizing the sulfonic acids to obtain preferentially oil-soluble sulfonates.

6. In the preparation of preferentially oil soluble sulfonic acids in which a hydrocarbon oil is treated with fuming sulfuric acid and the sludge separated from the sour oil, the improvement comprising contacting the sour oil with from 0.02 to 10% of a solid sorbent material, removing the sorbent material and recovering preferentially oil soluble sulfonic acids from the oil.

CHARLES A. COHEN.

REFERENCES CITED

The following references are of record in the file of this patent:

UNITED STATES PATENTS

| Number | Name | Date |
|---|---|---|
| 1,286,179 | Humphreys | Nov. 26, 1918 |
| 1,387,868 | Robinson | Aug. 16, 1921 |
| 1,709,149 | Phillips | Apr. 16, 1929 |
| 1,766,304 | Petroff | June 24, 1930 |
| 1,974,089 | Tietis | Sept. 18, 1934 |
| 2,158,680 | Retailliau | May 16, 1939 |
| 2,179,008 | Campbell | Nov. 7, 1939 |
| 2,187,883 | Lemmon | Jan. 23, 1940 |
| 2,191,091 | Bray | Feb. 20, 1940 |
| 2,214,037 | Archibald | Sept. 10, 1940 |
| 2,215,362 | Robinson | Sept. 17, 1940 |
| 2,226,092 | Clarke | Dec. 24, 1940 |
| 2,227,377 | Mapes | Dec. 31, 1940 |
| 2,236,933 | Beck | Apr. 1, 1941 |
| 2,270,214 | Adams | Jan. 13, 1942 |
| 2,282,033 | Chechot | May 5, 1942 |
| 2,340,947 | Evans | Feb. 8, 1944 |
| 2,348,609 | Cohen | May 9, 1944 |
| 2,361,476 | Higbee | Oct. 31, 1944 |
| 2,361,805 | Wilson | Oct. 31, 1944 |
| 2,388,677 | Cohen | Nov. 13, 1945 |
| 2,403,185 | Lemmon | July 2, 1946 |
| 2,413,311 | Cohen | Dec. 31, 1946 |